(12) United States Patent
Hayes, Sr.

(10) Patent No.: US 6,898,489 B1
(45) Date of Patent: May 24, 2005

(54) VEHICLE CONTROL SYSTEM WITH RADIO FREQUENCY IDENTIFICATION TAG

(75) Inventor: Doyle A. Hayes, Sr., Grand Rapids, MI (US)

(73) Assignee: Pyper Products Corporation, Battle Creek, MI (US)

( * ) Notice: Subject to any disclaimer, the term of this patent is extended or adjusted under 35 U.S.C. 154(b) by 1 day.

(21) Appl. No.: 10/248,927

(22) Filed: Mar. 3, 2003

Related U.S. Application Data

(60) Provisional application No. 60/319,304, filed on Jun. 11, 2002.

(51) Int. Cl.[7] ............................................. G06F 19/00
(52) U.S. Cl. ................................ 701/1; 701/2; 701/33; 340/5.2; 340/572.1
(58) Field of Search ........................... 701/1, 2, 32, 33, 701/35, 36; 340/5.61, 5.8, 5.21, 5.26, 5.2, 5.23, 5.72, 10.3, 539.1, 572.1, 572.8, 572.9

(56) References Cited

U.S. PATENT DOCUMENTS

| | | | | |
|---|---|---|---|---|
| 5,113,344 A | * | 5/1992 | Kellogg et al. ................ | 701/35 |
| 5,673,034 A | * | 9/1997 | Saliga ........................ | 340/5.26 |
| 5,675,490 A | * | 10/1997 | Bachhuber .................... | 701/32 |
| 5,742,618 A | * | 4/1998 | Lowe ........................ | 714/797 |
| 5,916,290 A | * | 6/1999 | Kiribayashi ................... | 701/45 |
| 6,061,617 A | * | 5/2000 | Berger et al. .................. | 701/50 |
| 6,107,917 A | * | 8/2000 | Carrender et al. .......... | 340/505 |
| 6,206,282 B1 | | 3/2001 | Hayes, Sr. et al. | |
| 6,359,547 B1 | * | 3/2002 | Denison et al. ............ | 340/5.73 |
| 2002/0153994 A1 | * | 10/2002 | Bonner et al. ............. | 340/5.21 |
| 2002/0163419 A1 | * | 11/2002 | Ott ............................ | 340/5.61 |

OTHER PUBLICATIONS

Clark Ritter: RFID An Educational Primer–RFID Educational White Paper Revision 1.50—Sep. 13, 1999. Pages 1–23.
RFID Applications for the Automotive Industry. Intermec Technologies Corporation—Nov. 2001—Printed in the U.S.A. 2 Pages.
RFID Overview—Introduction to Radio Frequency Identification. 1999 Amtech Systems Corporation. Printed in the U.S.A. 8 Pages, month is not available.
Application Guide—Preliminary—915 MHz Tag for Reusable Plastic Containers. 2001 Intermec Technologies Corporation. Printed in the U.S.A. 4 pages, month is not available.
Intermec: 915 MHz Tag for RPC—Application Guide. From: http://home.intermec.com. 3 Pages, Jun. 5, 2002.
Intermec: 2450 MHz Metal Mount Tag. From: http://home.intermec.com. 3 Pages Jun. 5, 2002.
Michelle Krebs: Tour Car, 2022. Popular Science. 12 Pages. Copyright 2002, month is not available.

* cited by examiner

Primary Examiner—Tan Q. Nguyen
(74) Attorney, Agent, or Firm—McGarry Bair PC

(57) ABSTRACT

A radio frequency identification system for a motor vehicle, in which RFID tags having unique alphanumeric codes are encapsulated and mounted to selected vehicle components, such as the vehicle chassis, body, or engine parts. The RFID tags are operably interconnected with a computer in the motor vehicle. The computer is operably interconnected with a vehicle operating system, such as the ignition system. The alphanumeric codes are read and transmitted to the computer, which compares the read codes with stored alphanumeric codes, and based on the comparison, controls the operation of the vehicle. Removal or destruction of an RFID tag or removal of a component in which an RFID tag is molded will cause the computer to deactivate the vehicle operating system, preventing operation of the vehicle.

30 Claims, 2 Drawing Sheets

VEHICLE CONTROL SYSTEM WITH RADIO FREQUENCY IDENTIFICATION TAG

CROSS REFERENCE TO RELATED APPLICATIONS

This application claims the benefit of U.S. provisional application Ser. No. 60/319,304, filed Jun. 11, 2002.

BACKGROUND OF INVENTION

1. Field of the Invention

This invention relates to vehicle control systems and vehicles incorporating such systems. In one of its aspects, the invention relates to an automobile with an interlock system to prevent theft or fraud involving vehicle parts. In another aspect, the invention relates to a vehicle control system using radio frequency identification tags mounted to one or more motor vehicle components.

2. Description of the Related Art

The use of a radio frequency identification (RFID) tag to identify one of a plurality of items having the same or a similar appearance, such as luggage or a waste container, is disclosed in U.S. Pat. No. 6,206,282 to Hayes, Sr. et al, which is incorporated herein by reference. A RFID tag or integrated circuit embedded into an item, such as luggage or a waste container, is readable by a scanner. The location of the item can be tracked, and information identifying the owner of the item or specific handling requirements can be encoded into the RFID tag and later read by a scanning device capable of decoding and displaying the information.

Warranty fraud is a significant problem affecting motor vehicles and other consumer products having multiple components that are the subject of a warranty. Warranty fraud frequently occurs when a component part, which is not within the manufacturer's warranty period, is placed in a vehicle which is within the manufacturer's warranty period. The vehicle is then returned to the manufacturer or the manufacturer's representative for replacement of the allegedly defective component part pursuant to the warranty. The absence of an effective means for controlling the fraudulent substitution of warranted parts imposes substantial costs on the manufacturers and consumers of such parts and the products in which they are used.

SUMMARY OF INVENTION

According to the invention a system for controlling the operation of a vehicle having a computer connected to an operating system for operating the vehicle comprises at least one radio frequency identification tag containing a predetermined permanently assigned alphanumeric code which is transmitted upon activation of the radio frequency identification tag. A radio frequency transmitter activates the radio frequency identification tag and directs the transmission of the code. A radio frequency reader receives the code transmitted from the radio frequency identification tag. The computer is operably connected to the radio frequency reader for receiving data from the radio frequency reader corresponding to the code transmitted from the radio frequency identification tag, the computer being programmed to compare the data from the radio frequency reader with preprogrammed data, and to generate a control signal to the operating system to either enable operation of the vehicle in the event that the read data matches the preprogrammed data, or to disable operation of the vehicle in the event that the read data does not match the preprogrammed data.

In one embodiment, the system includes a component part of the vehicle wherein the radio frequency identification tag is attached to the component part.

In another embodiment, the radio frequency identification tag is encapsulated in an encapsulation body comprising a plastic material or a resinous material.

In yet another embodiment, the encapsulation body is attached to the component part through a secure connection that will prevent the removal of the encapsulation body from the component part without the radio frequency identification tag being rendered inoperable.

In another embodiment, the encapsulation body is injection molded around the radio frequency identification tag so that any attempt to remove the radio frequency identification tag from the encapsulation body will render the radio frequency identification tag inoperable.

In yet another embodiment, a motorized vehicle comprises an operating system for operating the vehicle connected to a computer, and at least one radio frequency identification tag containing a predetermined permanently assigned alphanumeric code which is transmitted upon activation of the radio frequency identification tag. A radio frequency transmitter activates the radio frequency identification tag and directs the transmission of the code. A radio frequency reader receives the code transmitted from the radio frequency identification tag. The computer is operably connected to the radio frequency reader for receiving data from the radio frequency reader corresponding to the code transmitted from the radio frequency identification tag. The computer is programmed to compare the data from the radio frequency reader with preprogrammed data, and to generate a control signal to the operating system to either enable operation of the vehicle in the event that the read data matches the preprogrammed data, or to disable operation of the vehicle in the event that the read data does not match the preprogrammed data.

In yet another embodiment, the operation of a motorized vehicle comprising a radio frequency identification tag attached to a component of the motor vehicle, a transmitter mounted in the vehicle for sending a radio frequency signal to the radio frequency identification tag, and a reader mounted in the vehicle for reading a radio frequency signal transmitted from the radio frequency identification tag comprises a method comprising the steps of programming the radio frequency identification tag with a unique alphanumeric code; storing the unique alphanumeric code; sending a radio frequency activation signal from the transmitter to the radio frequency identification tag to initiate the operation of the radio frequency identification tag; sending the alphanumeric code by a radio frequency transmission from the radio frequency identification tag to the reader in response to the activation signal; processing the alphanumeric code in the reader; transmitting the alphanumeric code from the reader; comparing the alphanumeric code received from the reader with the stored alphanumeric code; sending an activation signal to the operational system to enable the operation of the motorized vehicle if the alphanumeric code received from the reader matches the stored alphanumeric code; prevent ing the operation of the motorized vehicle if the alphanumeric code received from the reader does not match the stored alphanumeric code; and preventing the operation of the motorized vehicle if no alphanumeric code is received from the reader.

DETAILED DESCRIPTION

In the embodiment described herein, the invention comprises a vehicle control system comprising one or more radio frequency identification (RFID) tags or integrated circuits which can transmit data to a radio frequency reader. A computer is operably interconnected with a vehicle operating system, such as an ignition system, a fuel system, or a brake system. The RFID tags are permanently programmed with alphanumeric codes, encapsulated into plastic or resinous bodies, and mounted to one or more components of a motor vehicle, such as the chassis, body, engine, or transmission. The RFID tags transmit the alphanumeric code to the radio frequency reader, which is operably connected to the computer. Based upon the RFID data received by the computer, the computer activates the vehicle operating system to thereby enable the starting and operation of the vehicle. If any one of the read RFID data is not correctly received by the computer, it will prevent operation of the vehicle.

Figure 1:
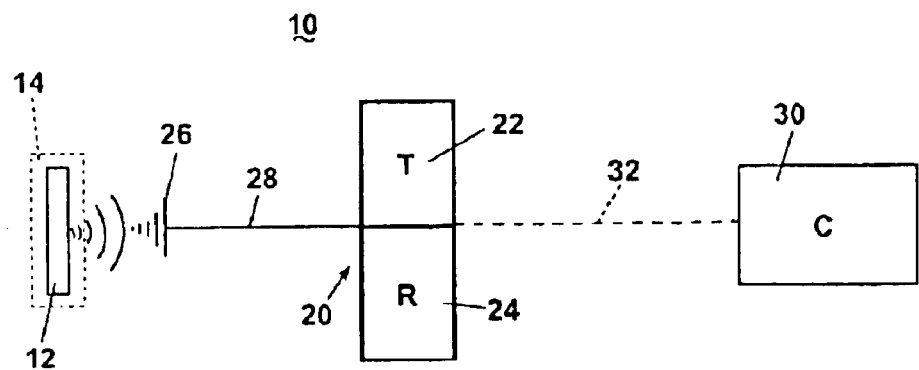
FIG. 1 is a schematic view of a radio frequency identification tag operatively interconnected with a computer according to the invention.

Referring to FIG. 1, an embodiment of the invention comprises a radio frequency control system 10 comprising an RFID tag 12, which can store data and transmit it as a radio signal to a transmitter/reader 20, and a computer 30. Suitable RFID tags are manufactured, for example, by Deister Electronics USA, Inc., Texas Instruments, and Intermec Technologies Corporation, and are well-known in the industry. Preferably, the RFID tag 12 is programmed with a unique, permanent alphanumeric code which cannot be re-programmed so that the unique identification of the RFID tag 12 is maintained over the life of the tag. The RFID tag 12 is fixedly mounted to a component part of a vehicle, such as an engine, a transmission, an alternator, etc. When the RFID tag 12. Is attached to the component part, the part will be permanently identified with the RFID tag 12 and its unique alphanumeric code.

Preferably, the RFID tag 12 is encapsulated by injection molding the tag 12 into a plastic or resinous encapsulation body 14, such as disclosed in U.S. Pat. No. 6,206,282 to Hayes, Sr. et al. The encapsulation body 14 is attached to the component part through a secure connection so that any attempt to remove the encapsulation body 14 or breach the encapsulation body 14 to remove the RFID tag 12 from the component part will render the RFID tag 12 inoperable, such as by the destruction of the RFID tag 12.

The transmitter/reader 20 comprises a conventional electronic component capable of sending and receiving radio signals to a remote RFID tag. Suitable transmitter/readers are generally capable of sending and receiving radio signals over a distance of approximately 8 feet. The transmitter/reader 20 comprises a transmitter 22 and a reader 24 incorporated into a single device. Alternatively, the transmitter 22 and the reader 24 can comprise separate devices. A radio antenna 26 is operably connected by an antenna link 28, such as a conventional electrical lead, to the transmitter 22 and the reader 24 in a conventional manner so that radio signals can be transmitted through the antenna 26 from the transmitter 22 and received by the reader 24 through the antenna 26. The transmitter/reader 20 is operably interconnected with a computer 30 through a computer link 32, which may be a conventional electrical lead or a radio frequency link.

The computer 30 is preprogrammed, preferably by the manufacturer, with identifying data, such as the alphanumeric code, for each RFID tag 12 in the vehicle, and can compare the preprogrammed data with data transmitted from each RFID tag. If the data transmitted from each RFID tag 12 matches the preprogrammed data, the computer 30 is programmed with a response that will enable operation of the vehicle, such as by activating the ignition system. Conversely, if the data transmitted from any of the RFID tags 12 fails to match the preprogrammed data, the computer 30 is programmed to disable the vehicle, such as by disabling the ignition system.

The RFID tag 12 and transmitter/reader 20 operate as follows. The reader 24 instructs the transmitter 22 to transmit a radio frequency signal through the antenna 26 to the RFID tag 12, thereby activating the RFID tag 12 and instructing the RFID tag 12 to transmit data as a radio signal. The RFID tag 12 transmits data through the antenna 26 to the transmitter 22, thence to the reader 24 where the data is decoded. Where, as with the herein-described invention, the transmitter/reader 20 is interconnected with the computer 30, the reader 24 transmits the data to the computer 30 where the data is further processed. According to the invention, the computer 30 is operably interconnected with other vehicle operating components or systems for control of such components or systems in response to the data transmitted from the transmitter/reader 20.

Figure 2:
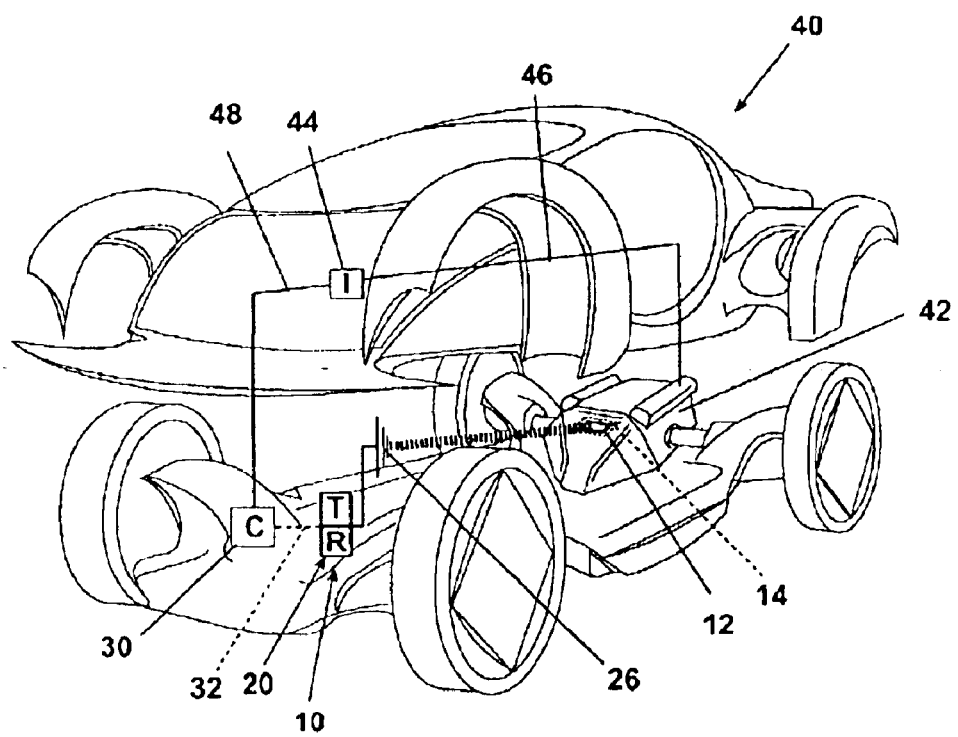
FIG. 2 is a schematic view of an embodiment of the invention showing the radio frequency identification tag of FIG. 1 injection molded into a component part of a motorized vehicle and operatively interconnected through a computer into the motorized vehicle ignition system according to the invention.

FIG. 2 shows an embodiment of the invention installed in a motor vehicle 40. The motor vehicle 40 is provided with a radio frequency control system 10 comprising an RFID tag 12, encapsulated within an encapsulation body 14, that is operably interconnected with a transmitter/reader 20 and a host computer 30, all of which are mounted to the motor vehicle 40. FIG. 2 shows the RFID tag 12 mounted to an engine 42 for illustrative purposes. RFID tags 12 can also be mounted to the vehicle chassis, body, transmission, or any other selected component part. The antenna 26 and the transmitter/reader 20 are preferably mounted to separate components of the vehicle 40, such as the body and the chassis, so that the vehicle 40 cannot be operated if the body is separated from the chassis.

The host computer 30 is operably interconnected with the ignition system 44 of the motor vehicle 40 through a link 48, which can comprise an electrical lead or a wireless link, such as a radio frequency link. The ignition system 44 is operably interconnected in a conventional manner with the vehicle engine 42 through a link 46 such as an electrical lead. In one embodiment, the computer 30 is programmed to send an activation signal to the ignition system 44 to enable the ignition system 44 to be operated to start the engine 42 in the event that correct data from all programmed RFID tags is received by the computer 30. Alternatively, if correct data from all programmed RFID tags is not received by the computer 30, the computer 30 can be programmed to send a blocking signal to the ignition system 44 to prevent the ignition system 44 from being used to start the engine 42, or programmed to control the opening of an electrical circuit which must normally be closed to operate the vehicle, thereby preventing operation of the vehicle.

Figure 3:
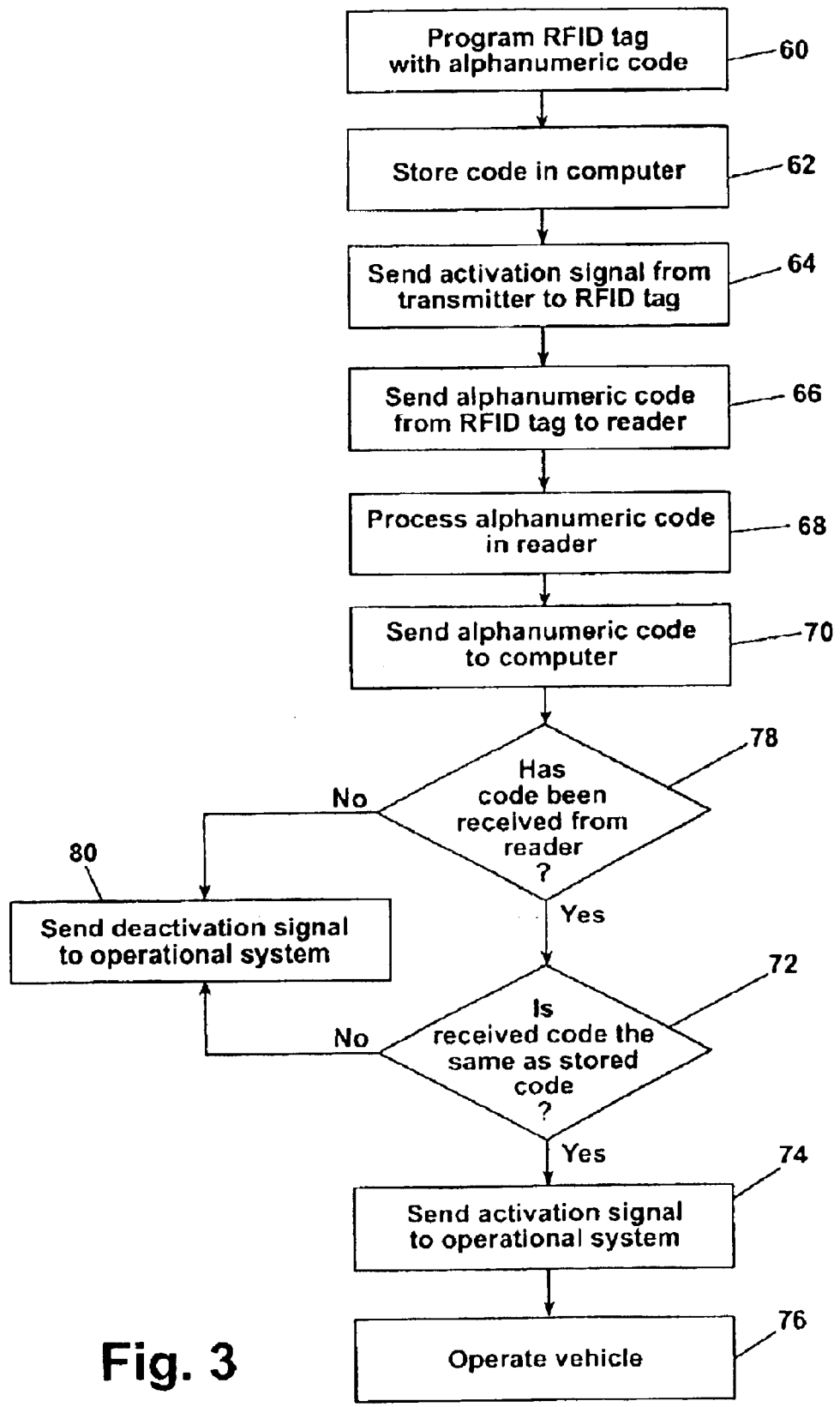
FIG. 3 is a flowchart showing a method of using the radio frequency identification tag of FIG. 1 to control the operation of a motorized vehicle.

Referring to FIG. 3, in operation, the vehicle control system comprises a series of discrete steps. The RFID tag 12 is first programmed 60 with a unique alphanumeric code. The code is also stored 62 in the computer 30. If a vehicle operator attempts to start the vehicle 40, the transmitter 22 sends an activation signal 64 to the RFID tag 12 to activate the RFID tag 12. In response to the activation signal, the alphanumeric code is transmitted 66 from the RFID tag 12 to the reader 24 where it is decoded 68 into information that can be processed by the computer 30, and transmitted 70 to the computer 30. The computer 30 first evaluates 78 whether information has been received from the reader 24. If information has not been received from the reader 24, such as would occur if the RFID tag 12 has been removed or rendered inoperable, the computer 30 sends a deactivation signal to the vehicle operational system 80 to prevent the operation of the vehicle 40. If information has been received from the reader 24, the computer compares the received data with the stored data 72. If the received data matches the stored data, the computer 30 sends an activation signal to the operational system 74, and the vehicle 40 can be operated 76. Conversely, if the received data does not match the stored data, the computer 30 sends a deactivation signal to the operational system 80. Alternatively, the computer 30 can send no activation signal, or can open an electrical circuit, to prevent the vehicle from being operated.

Preferably, the computer 30 is programmable by an authorized entity, such as an automobile dealer, so that the control system 10 can be operated with authorized replacement parts containing a new RFID tag 12. The authorized entity will have access to a registry of RFID-tagged parts, motor vehicles, and their associated alphanumeric codes, so that parts can be replaced as necessary and the vehicle can continue to be operated. However, any attempt to utilize unauthorized parts, or remove or replace an RFID tag, will render the vehicle inoperable.

The invention can be utilized to prevent warranty fraud and vehicle theft. To prevent warranty fraud, RFID tags 12 can be encapsulated by injection molding the encapsulation body 14 around the RFID tag 12, and attached to vehicle components that are potentially subject to warranty fraud, such as vehicle chassis, bodies or body components, engines and engine components, transmissions, audio/video components, and communications devices. In accordance with the invention, the RFID tags 12 are encoded with a permanent, non-user programmable alphanumeric code. All RFID tags 12 incorporated into a particular vehicle are operatively linked to the host computer 30 uniquely associated with the vehicle. The host computer 30 maintains the alphanumeric code for each RFID tag 12 in a non-user programmable memory. If the alphanumeric code from each RFID tag 12 matches the stored alphanumeric code in the host computer 30, the host computer 30 will enable the vehicle to be operated. However, if a vehicle component, such as for example an alternator, having an RFID tag 12 with an alphanumeric code different than that stored in the host computer 30, is installed in the vehicle by other than an authorized manufacturer's representative, the host computer 30 will prevent the vehicle from being operated. Thus, any attempt to substitute a component part with one having a different RFID tag 12 in order to perpetrate warranty fraud will render the vehicle inoperative. If a valid warranty service is performed by an authorized manufacturer's representative that involves replacement of a component part, the computer can be reprogrammed by the manufacturer's representative with the new component part RFID alphanumeric code. Because the RFID tag 12 is encapsulated in the encapsulation body, which is attached to the component part through a secure connection, any attempt to remove the RFID tag 12 and install it in a different component part will render the RFID tag 12 inoperable.

Similarly, the use of component parts with injection molded RFID tags 12 can prevent the theft of a motor vehicle. Information stored on one or more RFID tags 12 can readily identify a specific vehicle, even though the vehicle identification number (VIN) may have been obliterated. The vehicle information can be readily verified through a suitable database to determine whether the vehicle has been stolen. Furthermore, the use of component parts with injection-molded RFID tags 12 can prevent the disassembly of a stolen motor vehicle. The host computer 30 can be programmed so that it will render the vehicle inoperative unless all component parts having identified RFID tags 12 are present in the vehicle, thus diminishing significantly the value of individual component parts. As with warranty fraud, any attempt at the unauthorized installation of a component part will render the vehicle inoperative.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention, which is described in the appended claims.

What is claimed is:

1. A system for controlling the operation of a vehicle having a computer connected to an operating system for operating the vehicle comprising:

at least one radio frequency identification tag containing a predetermined permanently assigned alphanumeric code, the code being transmitted upon activation of the radio frequency identification tag;

a radio frequency transmitter for activating the radio frequency identification tag and directing the transmission of the code;

a radio frequency reader for receiving the code transmitted from the radio frequency identification tag; and the computer is operably connected to the radio frequency reader for receiving data from the radio frequency reader corresponding to the code transmitted from the radio frequency identification tag, the computer is further programmed to compare the data from the radio frequency reader with preprogrammed data, and to generate a control signal to the operating system to either enable operation of the vehicle in the event that the read data matches the preprogrammed data, or to disable operation of the vehicle in the event that the read data does not match the preprogrammed data.

2. The system of claim 1 and further comprising a component part of the vehicle wherein the radio frequency identification tag is attached to the component part.

3. The system of claim 2 and further comprising an encapsulation body encapsulating the radio frequency identification tag.

4. The system of claim 3 wherein the encapsulation body comprises a plastic material.

5. The system of claim 3 wherein the encapsulation body comprises a resinous material.

6. The system of claim 3 wherein the encapsulation body is attached to the component part.

7. The system of claim 6 wherein the encapsulation body is attached to the component part through a secure connection.

8. The system of claim 7 wherein the radio frequency identification tag and the encapsulation body are integrated so that the radio frequency identification tag will be rendered inoperable if an attempt is made to remove the radio frequency identification tag from the encapsulation body.

9. The system of claim 7 wherein the radio frequency identification tag and the encapsulation body are integrated so that the radio frequency identification tag will be rendered inoperable if an attempt is made to breach the secure connection.

10. A motorized vehicle comprising an operating system for operating the vehicle radio connected to a computer, and further comprising:

at least one radio frequency identification tag containing a predetermined permanently assigned alphanumeric code, the code being transmitted upon activation of the radio frequency identification tag;

a radio frequency transmitter for activating the radio frequency identification tag and directing the transmission of the code;

a radio frequency reader for receiving the code transmitted from the radio frequency identification tag; and the computer operably connected to the radio frequency reader for receiving data from the radio frequency reader corresponding to the code transmitted from the radio frequency identification tag, the computer being programmed to compare the data from the radio frequency reader with preprogrammed data, and to generate a control signal to the operating system to either enable operation of the vehicle in the event that the read data matches the preprogrammed data, or to disable operation of the vehicle in the event that the read data does not match the preprogrammed data.

11. The motorized vehicle of claim 10 and further comprising a component part of the vehicle wherein the radio frequency identification tag is attached to the component part.

12. The motorized vehicle of claim 11 and further comprising an encapsulation body encapsulating the radio frequency identification tag.

13. The motorized vehicle of claim 12 wherein the encapsulation body comprises a plastic material.

14. The motorized vehicle of claim 12 wherein the encapsulation body comprises a resinous material.

15. The motorized vehicle of claim 12 wherein the encapsulation body is attached to the component part.

16. The motorized vehicle of claim 15 wherein the encapsulation body is attached to the component part through a secure connection.

17. The motorized vehicle of claim 16 wherein the radio frequency identification tag will be rendered inoperable if an attempt is made to remove the radio frequency identification tag from the encapsulation body.

18. The motorized vehicle of claim 16 wherein the radio frequency identification tag will be rendered inoperable if an attempt is made to breach the secure connection.

19. A method of controlling the operation of a motorized vehicle having an operational system and comprising a radio frequency identification tag attached to a component of the motor vehicle, a transmitter mounted in the vehicle for transmitting a radio frequency signal to the radio frequency identification tag, and a reader mounted in the vehicle for reading a radio frequency signal transmitted from the radio frequency identification tag, the method comprising the steps of:

programming the radio frequency identification tag with a unique alphanumeric code;

storing the unique alphanumeric code;

sending a radio frequency activation signal from the transmitter to the radio frequency identification tag to initiate the operation of the radio frequency identification tag;

sending the alphanumeric code by a radio frequency transmission from the radio frequency identification tag to the reader in response to the activation signal;

processing the alphanumeric code in the reader;

comparing the alphanumeric code received from the reader with the stored alphanumeric code;

sending an activation signal to the operational system to enable the operation of the motorized vehicle if the alphanumeric code received from the reader matches the stored alphanumeric code;

preventing the operation of the motorized vehicle if the alphanumeric code received from the reader does not match the stored alphanumeric code; and preventing the operation of the motorized vehicle if no alphanumeric code is received from the reader.

20. The method of claim 19 and further comprising the step of encapsulating the radio frequency identification tag in an encapsulation body.

21. The method of claim 20 and further comprising the step of attaching the encapsulation body to the motorized vehicle.

22. The method of claim 21 and further comprising the step of rendering the frequency identification tag inoperable in the event that the encapsulation body is removed from the motorized vehicle.

23. The method of claim 21 and further comprising the step of rendering the frequency identification tag inoperable in the event that the frequency identification tag is removed from the encapsulation body.

24. A system for controlling the operation of a vehicle having a component part and an operating system for operating the vehicle comprising:

at least one radio frequency identification tag connected to the component part and containing a predetermined permanently assigned alphanumeric code, the code being transmitted by a radio frequency signal upon activation of the radio frequency identification tag;

a radio frequency transmitter for activating the radio frequency identification tag and directing the transmission of the code;

a radio frequency reader for receiving the code transmitted from the radio frequency identification tag;

a computer for containing stored data, and operably connected to the radio frequency reader and the vehicle operating system; and a comparator operably connected with the computer for comparing stored data in the computer and the code transmitted from the radio frequency identification tag;

wherein the computer is adapted to direct the operating system to either enable operation of the vehicle in the event that the transmitted data does not match the stored data or disable operation of the vehicle in the event that the transmitted data does not match the stored data; and wherein the at least one radio frequency identification tag is encapsulated in an encapsulation body.

25. The system of claim 24 wherein the encapsulation body comprises a plastic material.

26. The system of claim 24 wherein the encapsulation body comprises a resinous material.

27. The system of claim 24 wherein the encapsulation body is attached to the component part.

28. The system of claim 27 wherein the encapsulation body is attached to the component part through a secure connection.

29. The system of claim 28 wherein the radio frequency identification tag and the encapsulation body are integrated so that the radio frequency identification tag will be rendered inoperable if an attempt is made to remove the radio frequency identification tag from the encapsulation body.

30. The system of claim 28 wherein the radio frequency identification tag and the encapsulation body are integrated so that the radio frequency identification tag will be rendered inoperable if an attempt is made to breach the secure connection.

* * * * *

UNITED STATES PATENT AND TRADEMARK OFFICE
CERTIFICATE OF CORRECTION

PATENT NO. : 6,898,489 B1
DATED : May 24, 2005
INVENTOR(S) : Doyle S. Hayes, Sr.

It is certified that error appears in the above-identified patent and that said Letters Patent is hereby corrected as shown below:

Column 10,
Line 1, reads "event that the transmitted data does not match the" should read
-- event that the transmitted data matches the --.

Signed and Sealed this

Twenty-seventh Day of September, 2005

JON W. DUDAS
*Director of the United States Patent and Trademark Office*